July 11, 1961  B. E. VEACH  2,991,606
MACHINES FOR MANUFACTURING ICE CREAM NOVELTY PRODUCTS
Filed Dec. 15, 1959  2 Sheets-Sheet 1

INVENTOR
BOBBY E. VEACH
BY Albert J. Kramer
ATTORNEY

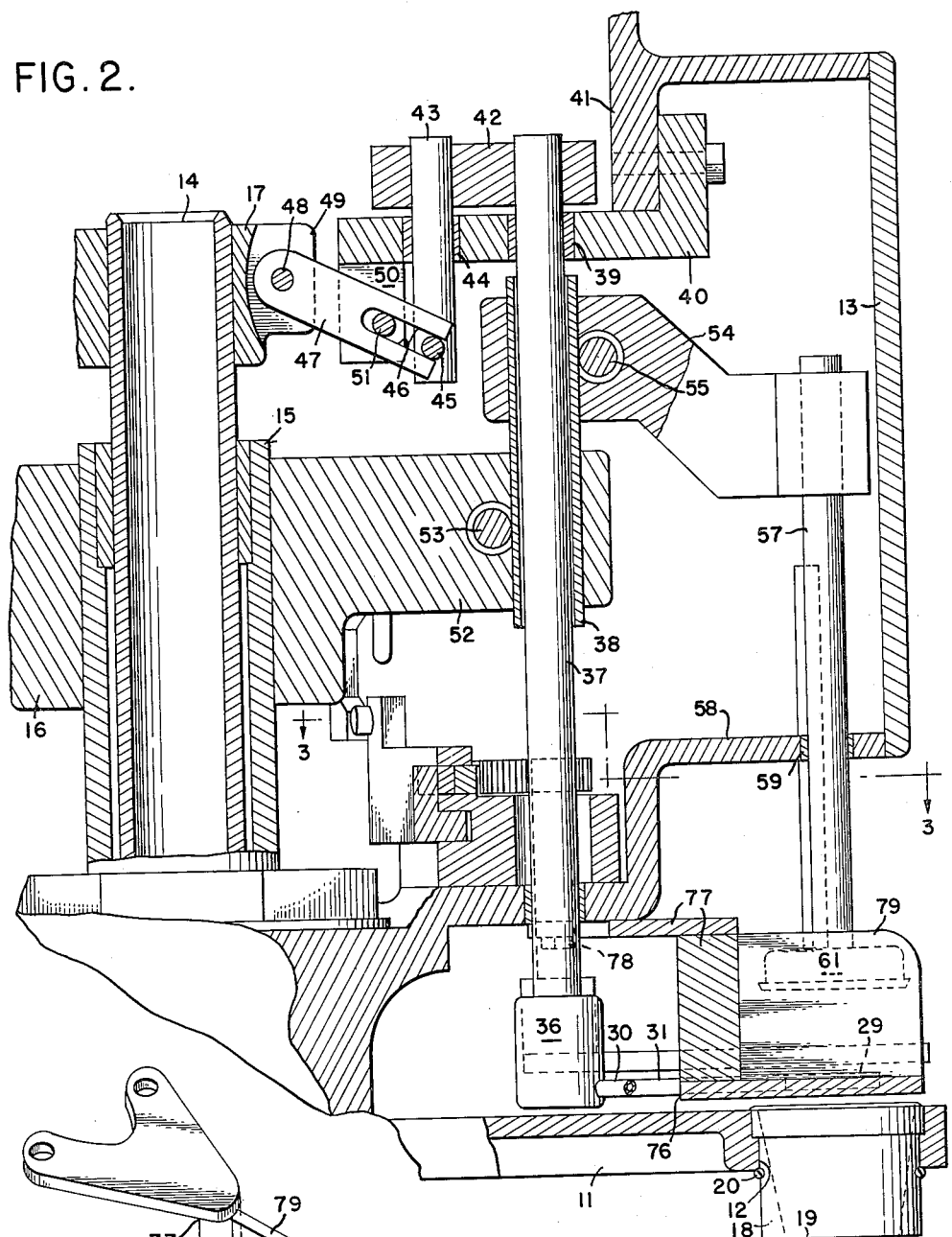
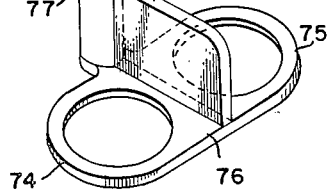
FIG. 2.
FIG. 4.
INVENTOR
BOBBY E. VEACH
BY Albert J. Kramer
ATTORNEY

United States Patent Office 2,991,606
Patented July 11, 1961

2,991,606
MACHINES FOR MANUFACTURING ICE CREAM NOVELTY PRODUCTS
Bobby E. Veach, Nashville, Tenn., assignor to Universal Machine Co., Inc., Baltimore, Md., a corporation of Maryland
Filed Dec. 15, 1959, Ser. No. 859,747
3 Claims. (Cl. 53—308)

This invention relates to machines for manufacturing novelty ice cream products in paper containers and it is more particularly concerned with improvements in such machines.

The invention is especially adapted to machines of the type described in copending application. Ser. No. 815,883, filed May 26, 1959, which includes a pair of adjacent container stations, an intermediate lid transfer station above each container station, a pair of lid supply stations on the outer sides of the transfer stations, and a mechanism, including arms swingably mounted, to transfer lids from the supply stations to the transfer stations. As these arms swing toward the transfer stations and are brought to rest by the mechanism, there is a tendency for the lids being carried thereby to override the transfer stations and, hence, become displaced relative to the movement of subsequent members to transfer them to the containers. When this happens, the lids cannot be picked up by the latter transfer members. Thus the final product cannot be completed and the operator must correct the difficulty which sometimes requires stoppage of the machine.

Accordingly, it is the general object of this invention to provide means for obviating this difficulty.

A specific object of the invention is the provision of means for preventing the overriding of the lids when they are being carried by the swinging arms from the lid supply stations to the intermediate transfer stations.

A further object of the invention is the provision of means for insuring the correct positioning of the lids at the intermediate transfer stations.

A still further object of the invention is the provision of means for incorporating a wall between the intermediate transfer stations to prevent the overtravel of the lids when they reach said stations.

These and still further objects and advantages of the invention will be apparent from the following description considered together with the accompanying drawing to which reference is made therein.

Figure 1:
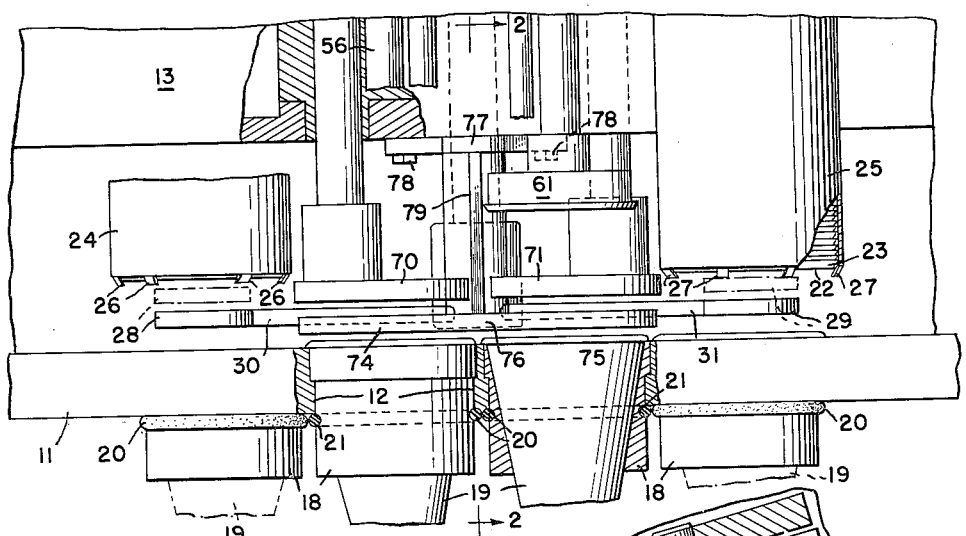
Figure 3:
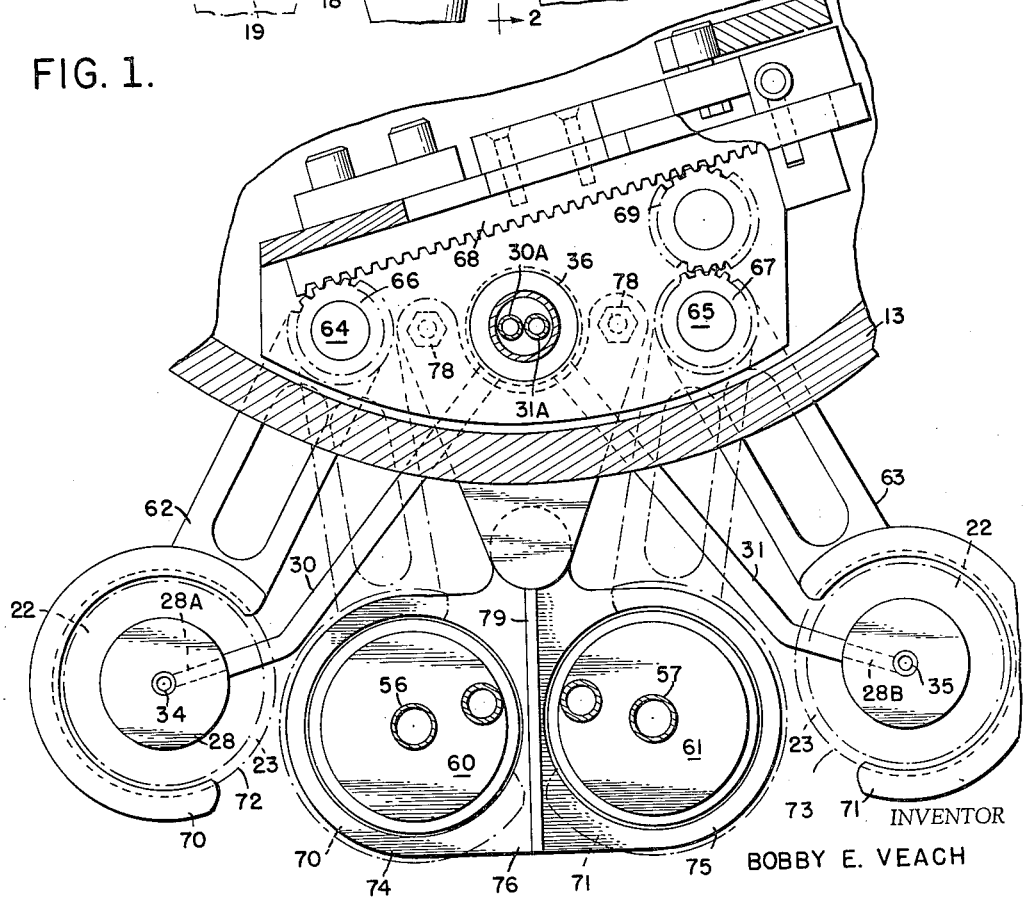

In the drawing:
FIG. 1 is a front elevational view of a fragmentary portion of a machine of the type mentioned for manufacturing novelty ice cream products.
FIG. 2 is a partial section, generally along the line 2—2 of FIG. 1.
FIG. 3 is a section along the line 3—3 of FIG. 2.
FIG. 4 is a perspective view of the stripper element to which the abutment wall is attached as a unit.

Referring with more particularity to the drawing in which like numerals designate like parts, the embodiment of the invention is illustrated in relation to a machine of the type described in said copending application Ser. No. 815,883 and which machine includes a horizontal loading wheel 11 (shown herein fragmentarily) provided at its periphery with a series of circumferentially spaced apertures 12. Above this loading wheel there is disposed a hollow crown 13 to which various parts of the machine are attached and to which reference will be made further hereinafter.

Within the crown 13 there is centrally situated a vertical shaft 14 surrounded by a sleeve 15, both of which are vertically reciprocable by means not shown herein or pertinent to the instant invention. The sleeve 15 carries a hub 16 to which various parts, hereinafter mentioned, are attached and the shaft 14 carries a corresponding hub 17.

Within each of the apertures 12 there is removably disposed an adapter 18 in the general form of a hollow cylinder, the interior wall of which is shaped to fit the receptacle to be used with the machine, such as the conical receptacles 19. The adapters are removably held in position by rubber ring retainers 20 engaging corresponding grooves 21 of the adapters just below the wheel 11.

Among the manifold functions of the machine is that of inserting a closure member or lid in the top of the receptacles 19 after there has been deposited in these receptacles the desired confectionery materials.

These closure members are, typically, in the form of circular discs 22 with annular end flanges 23. The mutually contacting surfaces of the flanges 23 and receptacles 19 are impregnated or coated with a thermoplastic bonding material, such as polystyrene resin, to seal the lids in place by the application of heat.

Stacks of the lid members are carried at supply stations in a pair of vertical tubular holders 24 and 25, the bottom openings of which are restricted in size by fingers 26 and 27, respectively to hold the weight of the stack, yet permitting the bottommost lid in the stack to be flexed thereagainst and removed by a downward force.

The removal of the lids is effected by vacuum platens 28 and 29 at the outer ends of a pair of arms 30 and 31, respectively. These arms are hollow and they communicate through channels 28A and 28B of the platens, with apertures 34 and 35 at the top of the platens, respectively.

The inner ends of arms 30 and 31 are attached to a cup 36 secured to the bottom of a hollow post 37 containing extensions 30A and 31A of pipes 30 and 31 leading to a source of vacuum (not shown). The post 37 extends upward through a sleeve 38, then through a bushing 39 in a bracket 40 attached to an inner rib 41 of the crown 13. The upper end of the post 37 is fixed to a cross bar 42. The upper end of a vertical bar 43 parallel to the post 37 is also secured to the cross bar 42 and it is slidably disposed in another bushing 44 of the bracket 40. The lower end of the bar 43 carries a pin 45 for engaging a slot 46 at one end of a lever 47. The other end of the lever is connected by a pin 48 to an arm 49 of the hub 17. The lever 47 is fulcrumed to vertical portion 50 of the bracket 40 by means of a pin 51 engaging the slot 46.

The sleeve 38 is secured to an arm 52 of hub 16 by a post clamp 53 and also to the inner end of an upper arm 54 by a similar post clamp 55. The outer end of the arm 54 is secured to a pair of hollow vertical shafts 56 and 57 which shafts extend downward through bushings in a horizontal wall section 58 of the crown 13, such as bushing 59 for the shaft 57.

The vertical movement of the inner shaft 14 is thus effective to move the vacuum platens 28 and 29 between an upper position (see dotted lines of FIG. 1) adjacent the lowermost lids in the stacks of holders 24 and 25, respectively, where the vacuum can suck off these lids, to a lowermost position (see full lines of FIG. 1) where the lids are transferred to transfer arms 62 and 63.

The inner ends of said transfer arms are secured to oscillating vertical shafts 64 and 65. Pinion gears 66 and 67 are secured to these shafts, respectively. A horizontal rack 68 meshes with gear 66 and with an idler or reversing gear 69 that in turn meshes with the opposite gear 67. By these means translation of the rack 68 results in simultaneously oscillating the shafts 64 and 65 and the arms 62 and 63 in opposite directions.

The arc of oscillation of the transfer arms is, in each case, between the position of the corresponding vacuum platen and the corresponding adjacent receptacle station for application of the lid. The outer ends of the transfer arms are each in the form of an open ring 70, 71, the openings 72 and 73, respectively, being on the inner side of the ring to provide clearance for the arms 30 and 31.

The sequence of motion is such that the arms 62 and 63 move outwardly when the vacuum platens 28 and 29 are in their uppermost position to receive the lids from the stacks. The platens then move downwardly and pass the lids to the insides of the rings 70, 71. The vacuum is then broken, permitting the platens to move farther downwardly clear of the rings and lids, whereupon the transfer arms 62 and 63 move to their innermost positions over the corresponding receptacle stations, constituting the intermediate transfer stations for the lids. Sealing irons 60 and 61 attached to shafts 56 and 57, then descend over the lids held by the rings 70, 71, strip them from the rings, retaining them meanwhile by vacuum means (not shown.) The sealing irons move downward into position in the upper ends of the receptacles 19. These irons each contain an electrical heating element to effect the sealing (not shown). When the lids are thus sealed in place, the vacuum is broken at the sealing irons and the irons are elevated. Stripper rings 74 and 75 as a unit, formed in a single plate 76 are disposed below the transfer rings 70, 71. They are bolted to an offset bracket 77 and function to disengage the receptacles from the sealing irons should there occur any incipient sticking between them as a result of the operation. The bracket 77 is secured to the crown 13 by bolts 78.

A wall 79 is disposed midway between the stripper rings 74 and 75 on the plate 76 and it is secured by welding or other means to the plate 76 or otherwise made integral therewith. This wall 79 projects upwardly between the irons 60 and 61. It is spaced from the adjacent inner side of the apertures of the stripper rings by an amount substantially equal to the horizontal distance between the inner and outer edges of the lid flanges 23, whereupon, when the lids are moved into position over the stripper rings by the arms 62 and 63, it will not only prevent them from overriding the stations above the stripper rings, but actually result in their being correctly positioned with respect to the container stations therebelow.

Having thus described may invention, I claim:

1. In a machine of the type described having a loading wheel and a pair of adjacent container stations at the periphery, an intermediate lid transfer station above each container station, a pair of lid supply stations on the outer sides of said transfer stations, and arms swingingly mounted to oscillate horizontally, and to receive and transfer lids from the supply stations to the transfer stations, a stationary vertical wall between said transfer stations to prevent overtravel of lids being so transferred.

2. In a machine of the type described having a pair of adjacent container stations, an intermediate lid transfer station above each container station, a pair of lid supply stations at the outer sides of said transfer stations and arms swingingly mounted to oscillate horizontally, and to receive and transfer lids from the supply stations to the transfer stations, a stationary vertical wall and means for supporting the wall between said transfer stations.

3. In a machine of the type described having a pair of adjacent container stations, an intermediate lid transfer station above each container station, a pair of lid supply stations at the outer sides of said transfer stations and arms swingingly mounted to oscillate horizontally, and to receive and transfer lids from the supply stations to the transfer stations, a stationary vertical wall and a bracket support for the wall between said intermediate stations.

References Cited in the file of this patent

UNITED STATES PATENTS

| | | |
|---|---|---|
| 1,963,316 | Wessman | June 19, 1934 |
| 1,992,693 | Fagan et al. | Feb. 26, 1935 |
| 2,325,557 | Terry | July 27, 1943 |